United States Patent Office 2,723,207
Patented Nov. 8, 1955

2,723,207

SHEET ADHESIVE MATERIAL FOR BONDING OF WORKPIECES

Alan Montague Hall and Ewart Harold Walton, Leicester, England, assignors to B. B. Chemical Co., Boston, Mass., a corporation of Massachusetts No Drawing. Application May 13, 1952,
Serial No. 287,618

Claims priority, application Great Britain May 22, 1951

2 Claims. (Cl. 117—122)

This invention is concerned with improvements in or relating to a sheet adhesive material for bonding of workpieces and will be described hereinafter, by way of example, with reference to the preparation of motor vehicle upholstery.

In the preparation of motor vehicle upholstery (the phrase upholstery is used herein to denote trim panels for doors, seat covers and like units) it has been proposed to prepare a unit having a quilted appearance by the following process: sheet material impregnated with thermoactive adhesive is placed upon a backing sheet (e. g. of fiber board or canvas) and covered with a layer of wadding followed by a layer of display material, e. g. leather cloth to form a four-layer assembly. The assembly is then subjected to heat and pressure in a press having a flat lower platen and an upper platen consisting of a number of narrow parallel bars spaced about 1" apart, both platens being heated. The heat and pressure cause the resin to fuse, whereupon it penetrates the wadding, and ultimately to cure so that the display material and the backing sheet become bonded together, but only along a number of narrow parallel bands, giving a quilted effect.

Heretofore impregnated sheet material used in carrying out the process referred to has not been as satisfactory as is desired. Thus for example use of certain prior sheet material results in a bond, between the display material and the backing sheet, which is impaired if the backing sheet is subjected to even a moderate degree of flexing, and such sheet material thus cannot well be used for the preparation of seat covers. Other sheet material proposed for use in carrying out said process necessitates, in its preparation, use of an impregnating composition which is only stable for a limited period and/or which contains ingredients which are not readily available.

It is one of the various objects of the present invention to provide an improved impregnated sheet material suitable for use in carrying out the process referred to.

In the patent applications filed by one of us, Alan Montague Hall, entitled Methods of Stabilizing Latex and Stabilized Latex Compositions, Serial No. 155,348, filed April 11, 1950 (now Patent No. 2,610,216, granted September 9, 1952), and Stabilization of Latex and Stabilized Compositions, Serial No. 155,347, filed April 11, 1950 (now Patent No. 2,610,158, granted September 9, 1952), there are disclosed stabilized natural rubber (i. e., *Hevea brasiliensis*) latex compositions comprising an aqueous dispersion of rubber particles stabilized by association of the individual particles with a urea-casein material precipitated thereon as by addition of an excess of an aldehyde. In a further application in the name of Alan Montague Hall and Ronald Woolman, entitled Stabilized Toughened Latex Compositions and Methods of Coating and Impregnating, Serial No. 155,349, filed April 11, 1950 (now Patent No. 2,651,618, granted September 8, 1953), there is disclosed a stabilized rubber latex composition similar to those of the preceding applications and containing added plastic material which may be a phenol aldehyde resin incorporated with the latex as an aqueous dispersion of a solution of the plastic material in a polar solvent.

We have found that a bond between display material and a backing sheet in the process referred to is obtained by impregnating a fibrous sheet material with a stabilized natural rubber latex and resin composition wherein the resin is a novolak resin and the composition contains sufficient curing agent to cause the resin to cure during the heat and pressure applied in the bonding process referred to. Unmasticated rubber and novolak resin are deposited on and in the fibrous sheet in a flexible resilient condition. In the bonding process, the novolak resin fuses prior to cure in contrast to a B-stage thermosetting resin and gives excellent penetration of the display material and the compressed wadding, where wadding is employed, and an excellent penetration or wetting of the backing sheet. Upon curing, the rubber-resin bonding agent forms a tough, strong connecting material possessing flexibility to an extent which substantially increases the life of the bond when subjected to the stresses encountered in such uses as motor vehicle upholstery. Display material which is satisfactorily bonded by the sheet material of the present invention includes unsupported or supported polyvinyl resin fibers, leathercloth, fabric or leather. Backing materials to which the display material may be bonded include hard board, i. e., Masonite, wood, metal, e. g., tin plate, or fabric such as hessian.

An improved impregnated sheet material according to the present invention will comprise a fibrous sheet material, suitably cotton bandage, or other woven or felted fibrous sheet material, including paper which is treated to effect a through-and-through impregnation with the stabilized latex-resin dispersion material.

The latex-resin composition employed for impregnation will include a latex stabilized in accordance with the teachings of either of the Hall applications, above referred to, involving the combination of urea and casein, and the stabilization of the rubber particles of the latex by association of the individual particles with urea-casein material precipitated thereon as by addition of an excess of an aldehyde. The resin employed in combination with the stabilized latex will be dissolved in a volatile organic polar solvent to form a solution which is then emulsified in water to form an emulsion which is combined with the latex. Novolak resins, which are ordinarily products of condensation in an acid medium of a phenol and insufficient aldehyde to make the product thermosetting are employed. The word "phenol" is used herein to denote phenols generally, i. e., xylenols, cresols, and the like and not monohydroxy-benzene only.

The mixture of the stabilized latex and novolak resin emulsion is adjusted to contain sufficient aldehyde to effect curing of the resin when subjected to heat. Where the stabilized latex contains sufficient aldehyde, it is not necessary to add additional aldehyde to the mixture. Relative proportions of the resin emulsion and rubber latex are employed to form a composition in which the ratio of rubber to resin is from 3:1 to 1:3, preferably 2:1 by weight of solids, the solids content of the mixture being in the range of 37% to 50%.

The fibrous sheet material is impregnated with such a latex-resin material to provide an impregnation of 0.25 to 0.5 grams solids per square inch. The impregnated sheet is then subjected to drying at temperatures insufficient to cause substantial curing of the resin. The dried impregntaed material is flexible, resilient and is ordinarily impervious.

When this impregnated material is assembled between a backing sheet and a layer of wadding upon which is disposed a layer of display material and the assembly subjected to heat and pressure, the rubber-resin material fuses and readily penetrates the compressed wadding and contacts the display material and then sets to bond the display material and the backing sheet firmly together. The bonded assembly is still somewhat resilient and flexible even after the resin has cured, so that the bond between the backing sheet and the display material is not impaired if the backing sheet is subjected to a considerable degree of flexing. The bonded material may thus be used advantageously for such difficult applications as the preparation of motor vehicle seat coverings.

The above and other of the objects and features of the present invention will become more clear from the following illustrative example. It is to be understood that the invention is not restricted to the specific reagents, proportions or procedures given in the example.

*Example.*—A stock solution was prepared by mixing together 124 parts by weight of urea, 241 parts by weight of casein and 615 parts by weight of water. The mixture was then heated on a water bath. During heating the casein and urea reacted together and a violent frothing took place due, apparently, to escape of gas. Heat was continued until no further frothing was observed. 10 parts by volume of 0.800 specific gravity ammonia were then added to the hot liquid and the liquid was made up to 1040 parts by weight by addition of water and allowed to cool. The resulting stock solution had a solids content of about 35%.

200 parts by weight of a 60% natural rubber latex made slightly alkaline with ammonia were combined with 15 parts by weight of the above stock solution and was stirred to insure thorough mixing. 17 parts by weight of a 40% formaldehyde solution in water were diluted with 23 parts by weight of water and the resulting solution added to the above mixture. This quantity of formaldehyde was sufficient to react with all the ammonia present and leave a small amount of excess formaldehyde.

An unmodified phenol aldehyde novolak (Bakelite resin 5468) to which 10% of hexamethylenetetramine had been added was dissolved in ethyl acetate to make a solution in which the resin was 50% by weight. 500 parts by weight of this resin solution was emulsified in an aqueous phase consisting of water—100 parts by weight; Nitromul solution (15%)—25 parts by weight; and casein—12½ parts by weight to make a resin emulsion. Nitromul is a proprietary emulsifying agent obtainable from Imperial Chemicals Industries, Ltd. and comprises the sodium salt of modified polyvinyl acetate-maleate. The resin emulsion so prepared was combined with the stabilized rubber latex composition prepared as above to form a mixture in which the ratio of rubber to resin was 2:1 by weight. A length of 2" open weave cotton bandage was impregnated with the above rubber resin composition to provide an impregnation of 0.3 grams solids per square inch and then dried. The resultant product was flexible, resilient and impervious.

A trim panel for a motor vehicle door was prepared by the following process: strips of the illustrative material were placed upon a hard fiber board backing sheet, i. e. Masonite, and covered with a layer of cotton wadding followed by a layer of display material, e. g. leather cloth. The assembly was then subjected to heat and pressure in a press having a flat lower platen and an upper platen consisting of a number of narrow parallel bars spaced about one inch apart, both platens being heated to about 165° C., and pressure being applied for 60 seconds. The heat and pressure caused the resin to fuse, whereupon it penetrated the wadding, and ultimately cured so that the display material and the backing sheet became firmly bonded together but only along a number of parallel bands, giving a quilted appearance, the wadding having been compressed along these lines by the bars of the press. The strip material was still somewhat resilient and flexible even after the resin had cured, the bond between the backing sheet and the display material not being impaired when the backing sheet was subjected to a considerable degree of flexing.

Satisfactory results have been obtained where the backing sheet is fibrous (e. g. fiber board as above) or metal (e. g. tin plate). It is believed that the formation of a firm bond, especially to metal, is largely due to the fact that the resin is one which, on heating, will fuse before curing and not a B-stage resin which will cure straight into the C-stage condition without first fusing. The illustrative impregnated material may also be advantageously used in the preparation of motor vehicle seat coverings in which a similar quilted effect is desired, a similar process to that just described being used but the backing sheet being canvas or hessian; the resilience and flexibility of the strip material after the resin has cured is usually of greater importance in this case.

Having thus described our invention, what we claim as new and desire to secure by Letters Patent of the United States is:

1. Sheet adhesive material comprising a porous fibrous base and an initially fusible thermoactive adhesive extending through said base, said adhesive comprising an intimate mixture of from 3 to 1 parts by weight of unmasticated natural rubber, from 1 to 3 parts by weight of uncured novolak resin and sufficient aldehyde to cure said novolak resin and convert said adhesive to a tough, strong, flexible material upon application of heat.

2. Sheet adhesive material comprising a porous fibrous base and from 0.25 to 0.5 grams solids per square inch of an initially fusible thermoactive adhesive extending through said base, said adhesive comprising an intimate mixture of from 3 to 1 parts of unmasticated natural rubber, from 1 to 3 parts of uncured novolak resin and sufficient aldehyde to cure said novolak resin and convert said adhesive to a tough, strong, flexible composition upon application of heat.

References Cited in the file of this patent

UNITED STATES PATENTS

| Number | Name | Date |
|---|---|---|
| 2,128,635 | Charch et al. | Aug. 30, 1938 |
| 2,210,348 | Swope | Aug. 6, 1940 |
| 2,243,969 | Lurie | June 3, 1941 |
| 2,277,941 | Almy | Mar. 31, 1942 |
| 2,399,786 | Battye et al. | Oct. 27, 1942 |
| 2,326,623 | Crosby | Aug. 10, 1943 |
| 2,356,225 | Cunnington | Aug. 22, 1944 |
| 2,373,613 | Szegvari | Apr. 10, 1945 |
| 2,410,053 | Drew | Oct. 29, 1946 |
| 2,434,527 | Untiedt | Jan. 13, 1948 |